(Model.)
C. J. Le ROY.
Reel for Measuring Bagging, &c.
No. 235,264. Patented Dec. 7, 1880.
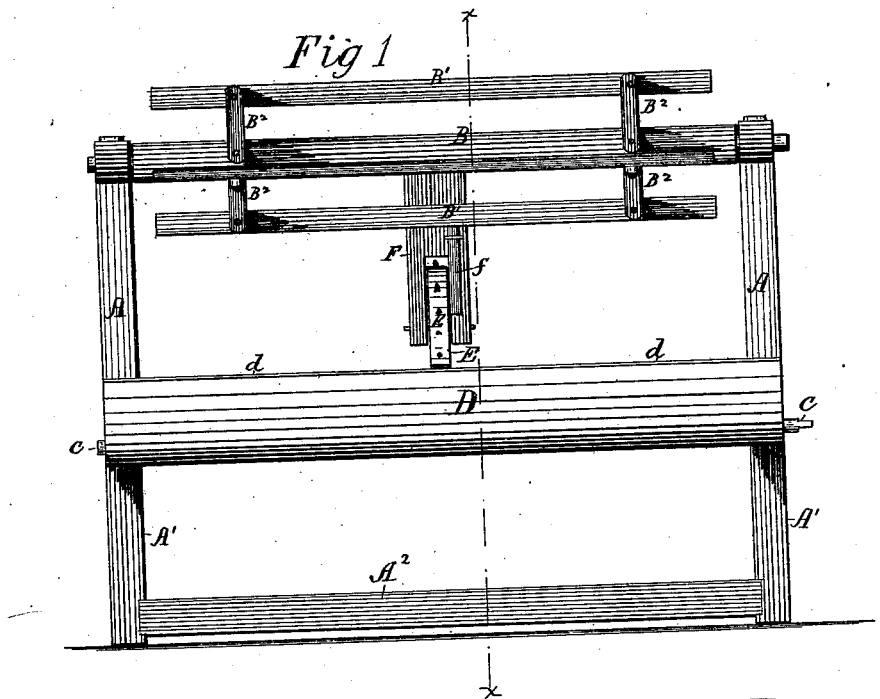
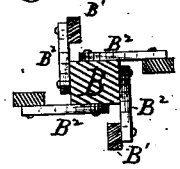
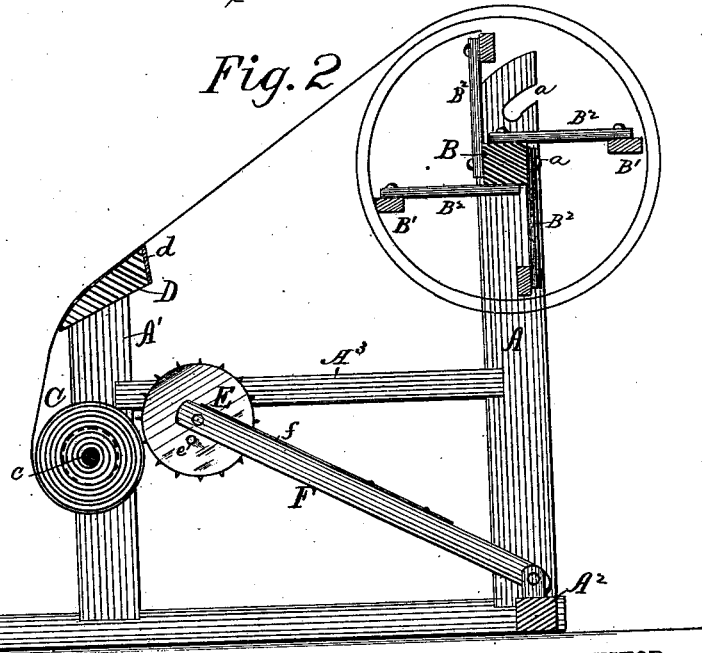
WITNESSES:
H. B. Brown
Wm. H. Rowe
INVENTOR:
C. J. Le Roy
BY
ATTORNEYS.

UNITED STATES PATENT OFFICE.

CHARLES J. LE ROY, OF PALESTINE, TEXAS.

REEL FOR MEASURING BAGGING, &c.

SPECIFICATION forming part of Letters Patent No. 235,264, dated December 7, 1880.

Application filed September 20, 1880. (Model.)

*To all whom it may concern:*

Be it known that I, CHARLES J. LE ROY, a citizen of the United States, residing at Palestine, in the county of Anderson and State of Texas, have invented a new and useful Cloth-Measuring Machine, of which the following is a full, clear, and exact description, reference being had to the drawings thereto annexed.

My invention relates to an improved machine for handling, measuring, and cutting bagging, matting, carpets, and other goods; and it consists in the peculiar arrangement of a spool or roller from which the stock is taken, a reel upon which it is wound from the roller, a cutting board or table, and a measuring-wheel, whereby the above operations may be effected in a simple and convenient method, hereinafter more fully described.

In the drawings, Figure 1 is a plan view. Fig. 2 is a vertical section through line $x$ $x$; Fig. 3, a sectional view of the reel collapsed, and Fig. 4 a detail of one of the bearings for the reel.

A A' A² A³ is a frame-work, in the elevated standards A A of which are formed open bearings $a$ $a$, in which a reel, B, is journaled and detachably held in place by latches $b$, as in Fig. 4. This reel should be provided with a crank-handle, by which it is revolved, and upon it is wound the material which is to be cut off.

C is the stock roller or spool upon which the goods are wound in bulk. This roller is journaled in bearings in the front standard, A', and immediately above it and on the top of the standards A' A' is arranged the fixed cutting-board D, whose upper surface is slightly rounded, and whose higher edge, next to the reel, is provided with a metal straight-edge, $d$, which forms a guide for the knife in the hands of the operator, and a support for holding the material tensely while being thus cut. By locating the cutting-table immediately above the roller C and at the edge of the machine, the operator can with an ordinary pocket-knife walk longitudinally with the board or table D and cut as he walks material of any width.

Between the roller C and the reel B is arranged the measuring-wheel E. This has a series of points on its periphery, which engage with the surface of the material on the roller, and which wheel receives a revolution from the unwinding of the material on roller C, which is commensurate with the amount of material unwound. This wheel E is journaled in the end of a swinging bar, F, whose outer end is hinged or jointed to the frame-work, and which bar allows the wheel E to constantly gravitate to contact with the roll of material, as the diameter of the latter diminishes from unwinding. The circumference of the wheel E is made of a definite length—a yard, for instance—and its revolutions are indicated to the ear by the pin $e$, which strikes a click-spring, $f$, at every revolution.

The reel B is made detachable and collapsible, as shown in Fig. 3, so that when a quantity of material is wound thereupon the material may be cut off, the reel removed, and then collapsed and taken out of the folds of the material, so that the latter may be wrapped up without being unwound.

I am aware that a winding-reel, a stock-roller, and a measuring-wheel have heretofore been combined in a cloth-measuring machine, and I do not claim these broadly; but What I desire to claim and secure by Letters Patent is—

The combination, with a suitable frame-work, of a winding-reel, B, and a stock-roller, C, a cutting-board, D, with edge $d$, located between the reel and roller and immediately above the latter, and a hinged or swinging bar, F, carrying a measuring-wheel, E, located also between the reel and roller, and arranged to rest, by gravity, peripherally upon the roll of material on the roller C, substantially as and for the purpose described.

C. J. LE ROY.

Witnesses:
EDWARD WISE,
WILEY P. MANGHAM.